No. 635,128. Patented Oct. 17, 1899.
C. M. DISSOSWAY.
WHEEL WITH TRACTION RIM.
(Application filed Mar. 16, 1899.)

(No Model.)

WITNESSES:
J. W. Wiman
Peter A. Ross

INVENTOR
Crowell M. Dissosway
BY
Henry Connett
ATTORNEY

THE NORRIS PETERS CO., PHOTO-LITHO., WASHINGTON, D. C.

United States Patent Office.

CROWELL M. DISSOSWAY, OF NEW YORK, N. Y., ASSIGNOR OF ONE-HALF TO JOHN GOODCHILD, GUARDIAN, OF SAME PLACE.

WHEEL WITH TRACTION-RIM.

SPECIFICATION forming part of Letters Patent No. 635,128, dated October 17, 1899.

Application filed March 16, 1899. Serial No. 709,254. (No model.)

*To all whom it may concern:*

Be it known that I, CROWELL M. DISSOSWAY, a citizen of the United States, residing in the borough of Manhattan, and in the city, county, and State of New York, have invented certain new and useful Improvements in Wheels with Traction-Rims, of which the following is a specification.

This invention relates to the class of wheels which roll over a surface, as driving vehicle-wheels, pulleys, and the like, and perform their functions through traction, the object being to provide the peripheral face of a metal wheel-rim with insets of some material softer than the metal of the wheel, which increases the traction or hold of the wheel on a rail, a belt, or other surface over which the wheel or pulley rolls.

Figure 1:
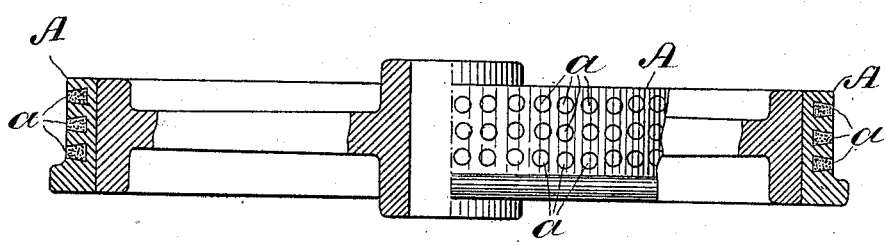
Figure 2:
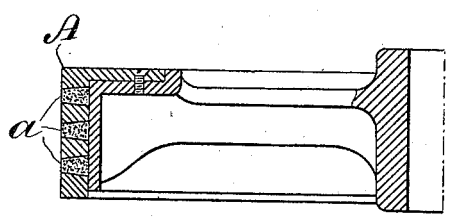
Figure 3:
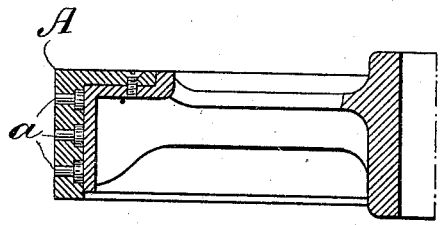
Figure 4:
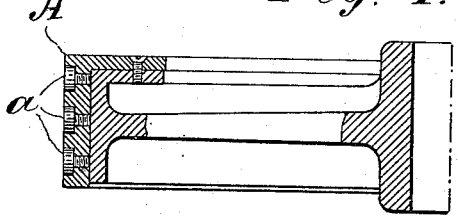

In the accompanying drawings, which illustrate embodiments of the invention, Figure 1 is an edge view, partially in section, showing the driving-wheel of a locomotive or other automobile provided with my improvements. Figs. 2, 3, and 4 are fragmentary sectional views showing various ways of putting in the insets.

In all of the views, A represents the metal rim of the wheel, and *a* the insets of softer material set therein. Various materials may be employed for the insets, as cork, wood, or a metal which is softer than the metal of the wheel-rim, which latter will usually be of iron or steel. If it be the rim or tire of a locomotive-driver, it will be of steel, and if it be the rim of a pulley it will usually be of cast-iron and be integral with the arms and boss of the pulley. Cork is preferred for the insets, either cork cut integrally from the piece or a cork composition. It is also preferable to make the recesses for the insets cylindrical, as boring is the cheapest way of making the recess. Where cork or like compressible material is used for the insets, it is preferable to enlarge the recesses at the bottom, as seen in Fig. 1. The insets are then compressed, inserted, and allowed to expand *in situ*.

Fig. 2 shows a rim wherein the conical recesses for the insets extend entirely through the rim, and Fig. 3 shows counterbored recesses to receive heads on the insets. In these constructions the insets are inserted from the inside of the rim before the latter is put on the wheel. Fig. 4 shows a construction where the recess to receive the inset is counterbored from the outside and the inset has a shank which screws into the rim.

"Rim" is here used as synonymous with "tire." In some cases the integral portion of the wheel-rim is provided with an outer portion shrunk or fastened on and called a "tire;" but the tire forms a part and a substantially integral part of the rim.

The function of the insets is to provide a frictional surface for the production of traction, and the invention is limited to traction-wheels, or wheels which roll over a surface either as a locomotive-driver rolls over a rail or as a pulley rolls over a belt, whether it drives the belt or is driven thereby.

Having thus described my invention, I claim—

1. A wheel having a removable tire or rim of metal, and having insets of cork or the like in and extending entirely through said rim and bearing on the face of the wheel.

2. A wheel having insets in its rim or tire and extending entirely through the same, said insets being of softer material than the tire and occupying counterbored recesses therein.

3. A wheel having a removable tire, and headed insets in and extending through said tire, the said insets being of relatively soft material and occupying counterbored recesses in the tire.

4. A wheel for traction purposes having a removable metal rim or tire, and having insets in the face of and extending entirely through said tire, said insets being of softer material than the tire, cylindrical, and screwed into the tire.

5. A wheel for traction purposes having a removable metal rim or tire, and having screwed into its face headed insets of softer material than the tire, said insets occupying counterbored recesses in said tire.

In witness whereof I have hereunto signed my name, this 13th day of March, 1899, in the presence of two subscribing witnesses.

CROWELL M. DISSOSWAY.

Witnesses:
PETER A. ROSS,
HENRY CONNETT.